United States Patent [19]

Chappel

[11] Patent Number: 4,836,046
[45] Date of Patent: Jun. 6, 1989

[54] AUTOMATIC BICYCLE TRANSMISSION

[76] Inventor: Gilmore H. Chappel, 6100 City Ave., Executive House, Apt. 1718, Philadelphia, Pa. 19131

[21] Appl. No.: 45,310

[22] Filed: May 4, 1987

[51] Int. Cl.[4] .......................... G05G 1/14; F16H 9/10; B62H 9/00; B62H 1/02
[52] U.S. Cl. .................................. 74/594.2; 474/56; 474/57; 280/236; 280/260
[58] Field of Search ................. 74/594.1, 594.2, 594.3; 474/56, 57, 50; 280/236, 238, 259, 260, 261

[56] References Cited

U.S. PATENT DOCUMENTS

| | | | |
|---|---|---|---|
| 3,867,851 | 2/1975 | Gregory et al. | 474/56 |
| 3,938,403 | 2/1976 | Donaldson | 474/56 |
| 3,969,948 | 7/1976 | Pipenhagen | 474/57 |
| 4,077,648 | 3/1978 | Seul | 280/236 |
| 4,164,153 | 8/1979 | Moritsch et al. | 280/236 |
| 4,201,094 | 5/1980 | Rathmell | 280/236 |
| 4,260,386 | 4/1981 | Frohardt | 474/57 |
| 4,263,820 | 4/1981 | Wetherald | 74/594.2 |
| 4,373,926 | 2/1983 | Fullerton | 474/56 |
| 4,598,920 | 7/1986 | Dutil et al. | 474/50 |
| 4,684,143 | 8/1987 | Sato | 280/260 |
| 4,701,152 | 10/1987 | Dutil et al. | 280/230 |

FOREIGN PATENT DOCUMENTS

| | | | |
|---|---|---|---|
| 0112112 | 6/1984 | European Pat. Off. | 280/236 |
| 978916 | 4/1951 | France | 474/56 |
| 981230 | 5/1951 | France | 474/56 |
| 0026653 | 2/1984 | Japan | 474/56 |
| 8103646 | 12/1981 | PCT Int'l Appl. | 280/236 |
| 8302925 | 9/1983 | PCT Int'l Appl. | 474/57 |
| 174415 | 10/1935 | Switzerland | 474/57 |

Primary Examiner—Richard E. Moore
Assistant Examiner—Vinh Luong

[57] ABSTRACT

An automatic bicycle transmission includes in combination a sprocket wheel assembly which is responsive to the input torque applied at the pedals, a chain takeup assembly to maintain the chain taut under all operative positions of the sprocket wheel assembly and a hydraulic cylinder operatively connected to the takeup assembly by a control cable to apply hydraulic damping forces upon the sprocket wheel assembly to hydraulically smooth the transition between high gear ratio and low gear ratio positions. The sprocket wheel assembly includes a reference wheel that is rotated by the pedals and a pair of diametrically opposed chain gear sliders and a pair of diametrically opposed chain sliders. All of the sliders are simultaneously radially reciprocal along radial slots in the reference wheel in response to changes of input torque applied at the pedals. A star with radially extending fingers is affixed for rotation with the reference wheel and each finger is respectively connected to a slider through a pivotal link. An adjustable coil spring is provided at each connection between a link and a finger to continuously bias the sliders to their radially outward positions.

11 Claims, 4 Drawing Sheets

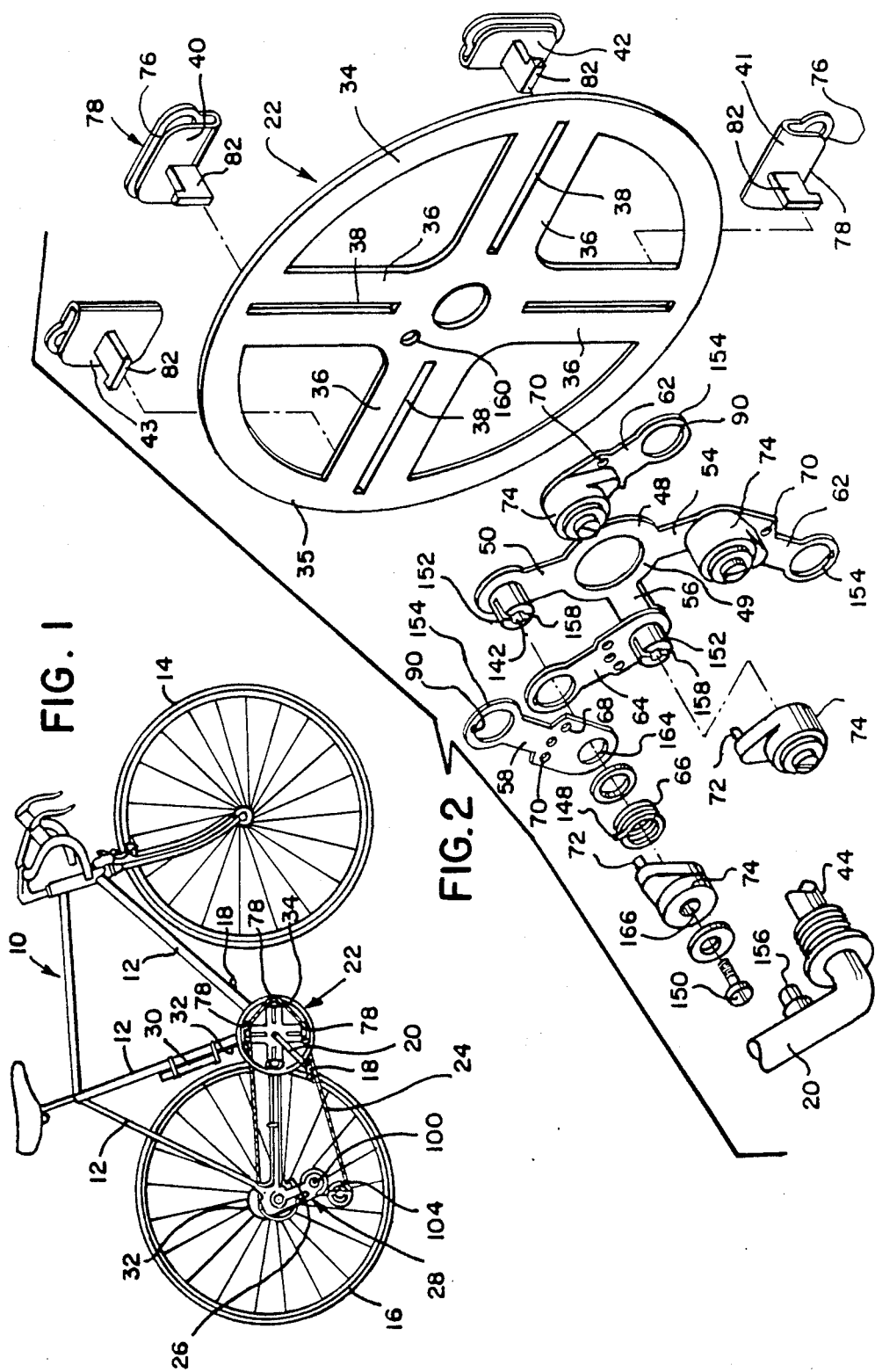

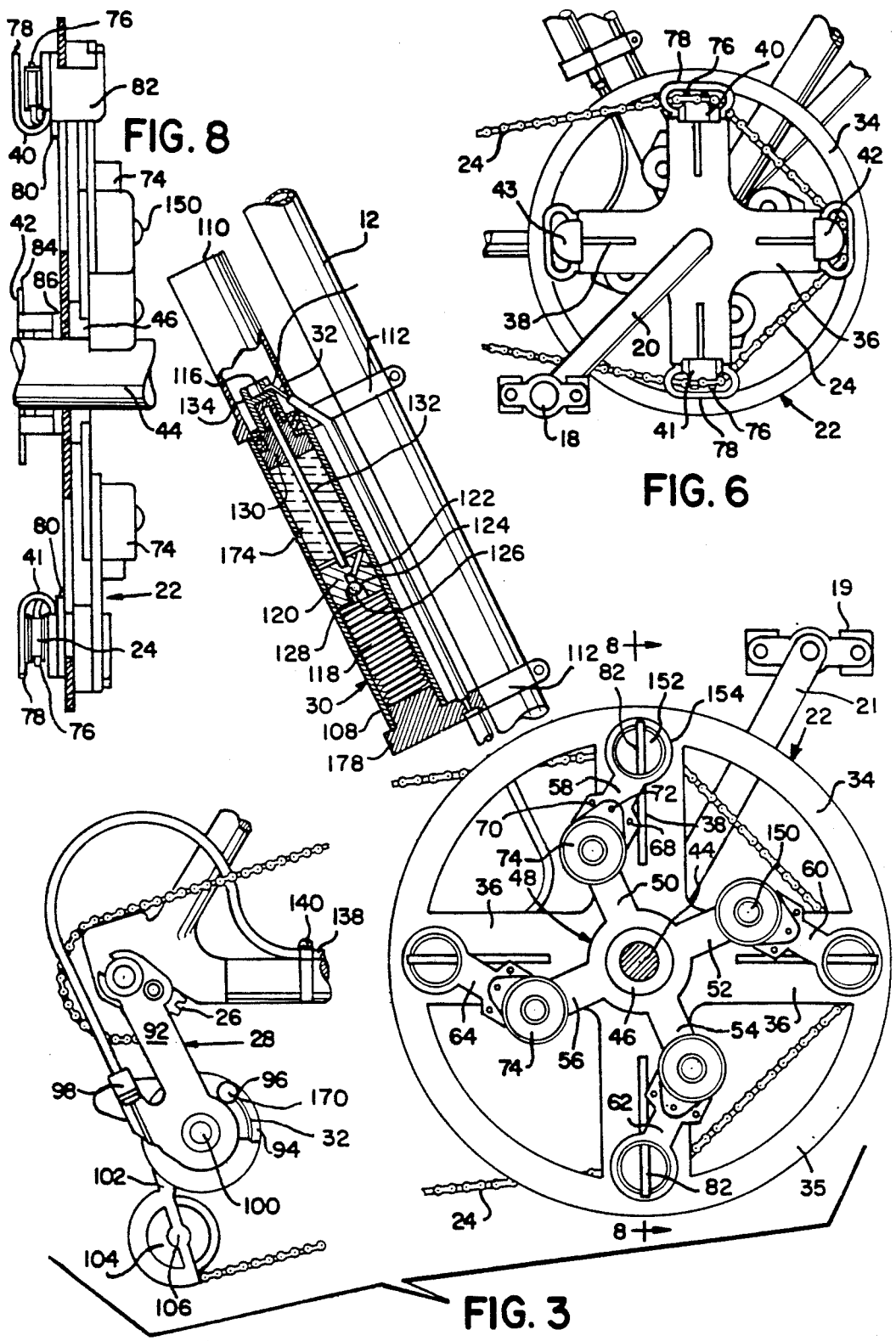

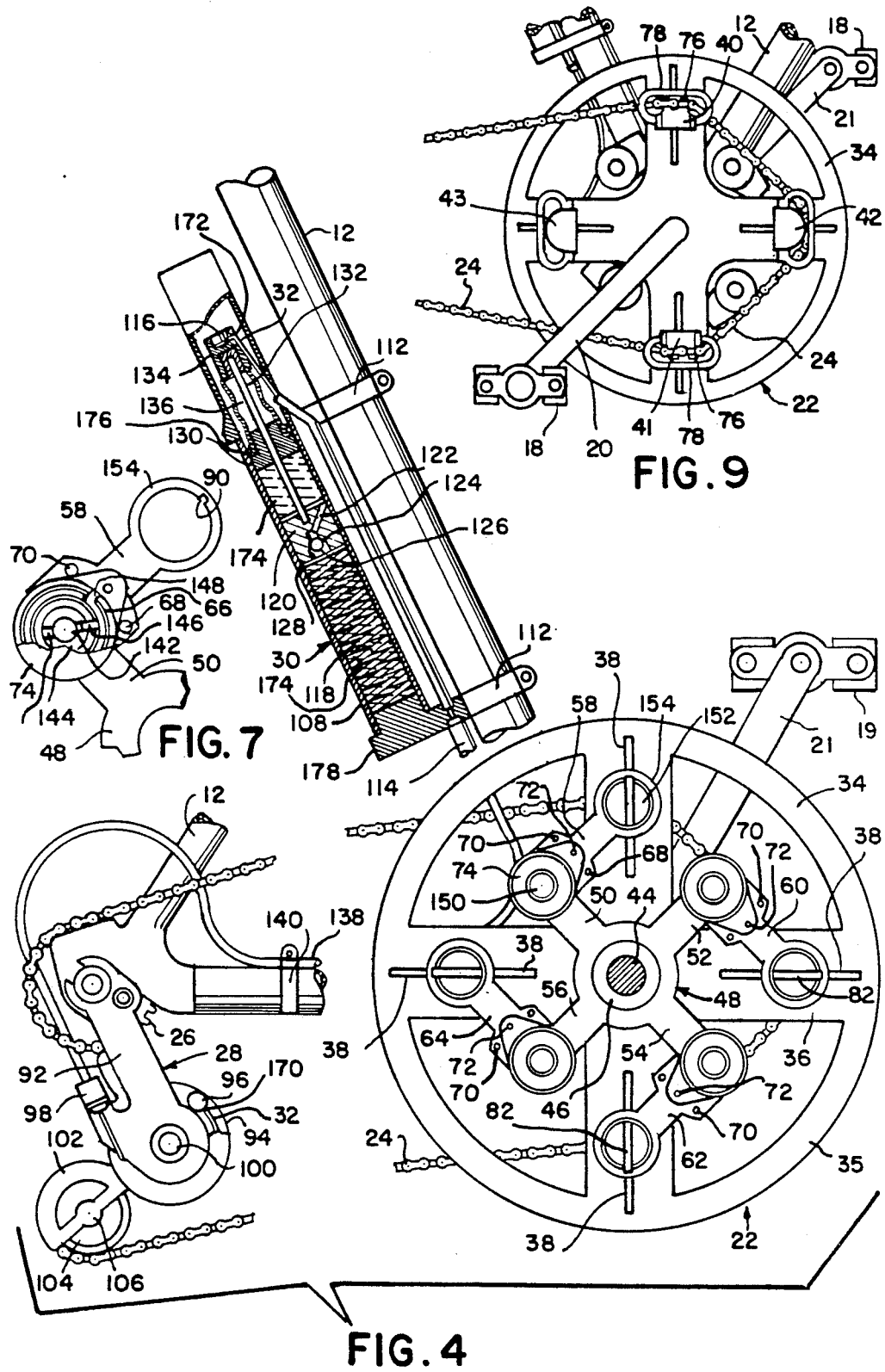

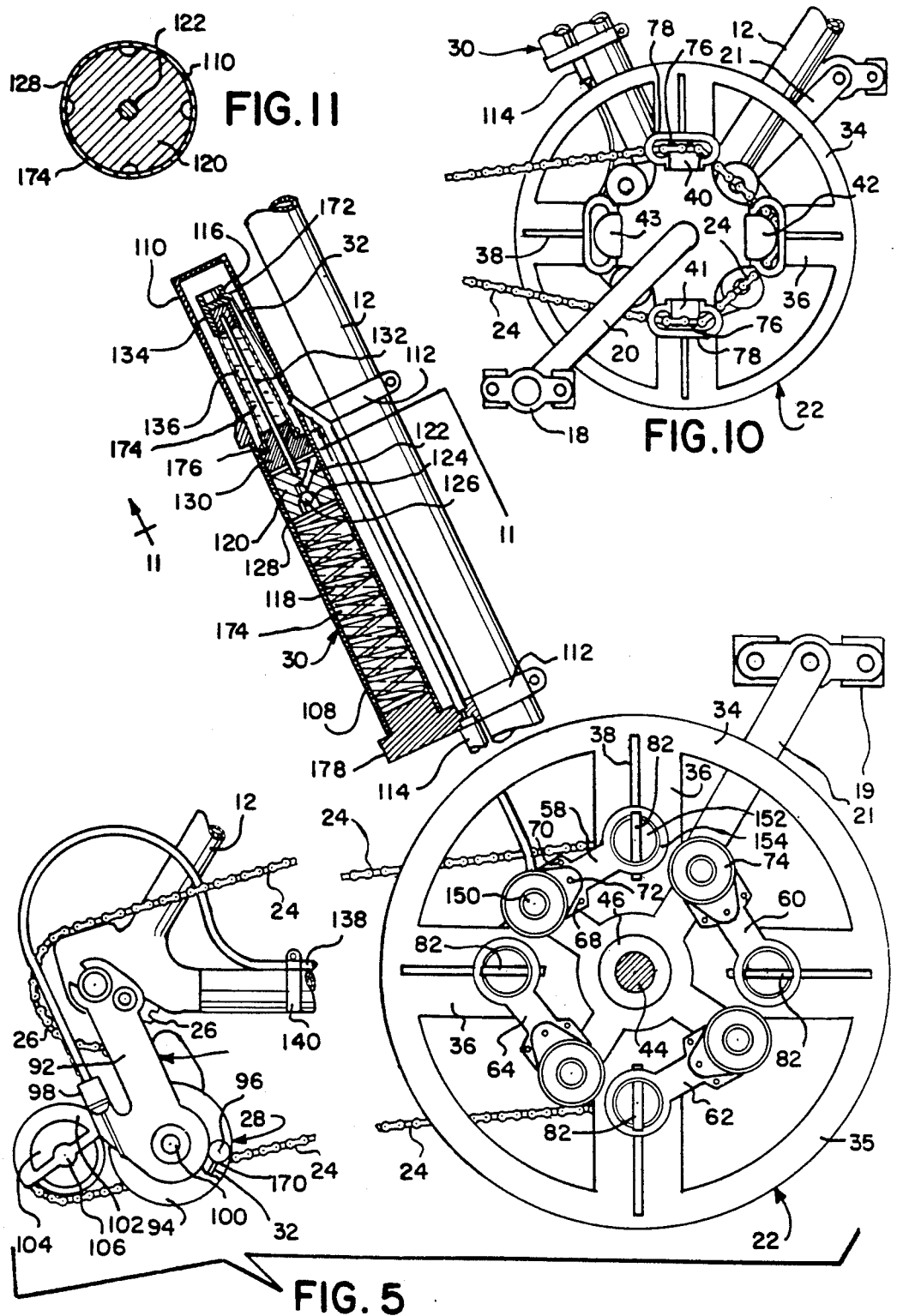

AUTOMATIC BICYCLE TRANSMISSION

FIELD OF INVENTION

The present invention relates generally to the field of transmissions of the multi-gear type particularly useful with bicycles, and more particularly, relates to an automatic bicycle transmission wherein the gear ratio between the input and output can be automatically varied in response to the power requirements.

BACKGROUND OF THE INVENTION

Prior workers in the art during the past several years have developed numerous types of more or less automatically operating bicycle transmissions. The prior art transmissions have generally been designed to automatically vary the gear ratio between the input and the output in response to the effort exerted upon the pedals by the user. For example, U.S. Pat. No. 3,850,044 to Hagen and U.S. Pat. No. 3,969,948 to Pipenhagen, Jr., are exemplary of previous types of automatic bicycle transmissions wherein the positions of a plurality of chain contacting and driving sprockets can be automatically varied between radially inward positions and radially outward positions to thereby automatically vary the effective diameter of a sprocket wheel assembly. The determination of the radial positions of the various driving sprockets in these transmissions is a function of the input torque whereby, by increasing the input torque, the effective diameter of the sprocket wheel assembly components will be decreased to correspondingly increase the power output of the transmission. When the input torque applied at the pedals is increased, the plurality of chain contacting sprockets would be urged in a direction to increase the effective diameter of the chain driving sprockets, thereby decreasing the output torque, but increasing speed.

Other types of automatic bicycle transmissions have been disclosed in may previous Patent Cooperation Treaty applications, International Application Nos. PCT/US82/01271 and PCT/US83/0089.

All of the prior art automatic bicycle transmissions of which I am familiar suffer from a common operating problem whereby the interaction of the driving chain with the circularly spaced driving sprockets is such that an increase or decrease in the effective diameter of the sprocket wheel assembly could not be smoothly made without a noticeable change. The disengagement and engagement of the individual driving sprockets and the driving chain was in the past always accompanies by an unwanted and uncontrollable clatter or shock, a condition which was detrimental and annoying when operating any type of bicycle transmission. In the case of my more recent inventions, as disclosed in the said Patent Cooperation Treaty applications, the problems of clatter or shock had largely been solved, but the changes in effective sprocket wheel assembly diameter were still accompanied by an undesirable drag or "feel". While my previous automatic transmissions provided a considerable improvement over everything that was previously known in this field, nevertheless, there was still a noticeable lack of smoothness which could be of concern to the user.

Additionally, the prior art automatic transmission of which I am aware have tended to be quite complicated and cumbersome in construction, thereby resulting in increased manufacturing costs, in increased maintenance costs, in increased weight and in interacting components that were continually subject to breakdown or wear.

SUMMARY OF THE INVENTION

The present invention relates generally to the field of bicycle transmissions and more particularly, is directed to an improved type of automatic bicycle transmission, including an expanding sprocket assembly, a cooperating chain takeup, and an interconnected spring biased hydraulic cylinder which functions in cooperation with the chain takeup to introduce an improved hydraulic smoothness during the gear ratio changing procedures.

The automatic transmission of the present invention is equally applicable both in new bicycle constructions and as a retrofit conversion to be applied to existing bicycles. In the case of use of the new automatic transmission in conjunction with existing bicycle designs, the usual derailleur would be replaced with the new spring-biased chain takeup of the present invention and the two existing large sprocket gears would be removed and replaced with the new, circularly balanced sprocket wheel assembly. The existing pedal crank, of either the one-piece or three-piece design, can be reused in the new assembly.

In accordance with the teachings of the present invention, a large reference wheel of fixed diameter is arranged for rotation upon a conventional hub which secures in the bicycle frame in usual manner. The reference wheel is rotated when the pedals rotate and comprises generally an outer rim and a plurality of radially oriented spokes. The spokes are arranged in the form of a cross whereby one diametrically opposed pair of spokes are oriented at an angle of ninety degrees from the other pair of diametrically opposed spokes.

Each of the spokes is provided with an elongated, radial slot and within these slots an opposed pair of chain drive sprockets and an opposed pair of chain slides are radially reciprocal in response to forces generated in the bicycle operation. It is noteworthy that when the large reference wheel is rotated by the pedals to a circularly oriented position wherein both of the chain drive sprockets are engaged within links of the drive chain, the automatic transmission will be locked in a particular gear ratio and the gear ratio cannot again be varied, either higher or lower, until such time as the reference wheel is rotated through a sufficient arc whereby one of the chain drive sprockets will be rotated to a position wherein it is not in engagement with the drive chain. It is only when one of the chain drive sprockets is rotated free from contact with the drive chain that gear ratio changing can occur.

An equalizing star which comprises four equal fingers oriented at ninety degrees from each other is rotatably positioned on the hub in close, parallel relationship to the large reference wheel. The fingers each terminate outwardly in a pivotal connection to which is affixed an adjustable coil spring. A plurality of similar links respectively interconnect the pivotal connection of each finger with either a chain slide or a chain drive sprocket and the springs are arranged to normally bias the pivotally attached links to continuously urge each of the chain drive sprockets and the chain slides radially outwardly along the radial slots toward their outermost or lowest power positions. When forces are applied at the pedals that are sufficient to overcome the combined bias of the four coil springs, the equalizing star will be caused to rotate relative to the reference wheel and all of the chain drive sprockets and chain slides will simultaneously and equally be caused to ride radially inwardly along their associated slots.

A new takeup mechanism has been designed for use adjacent the rear driven gear to maintain the drive chain taut in all radially adjusted positions of the chain drive sprockets and chain slides. A hydraulic cylinder or dashpot, including a spring biased piston, functions in conjunction with a suitable length of bicycle control cable and the takeup mechanism to dampen or otherwise smooth out the transitional adjustments between the chain and the chain drive sprockets when the chain drive sprockets are urged along their respective radial slots during the gear ratio changing procedures. The hydraulic fluid within the cylinder serves as a detent to smooth out or otherwise control jerky or other unwanted vibration or noise by applying fluid forces to the takeup in a manner to cause a relatively constant pressure to always be applied against the drive chain. The components of the automatic transmission of the present invention cooperatively function to assure a smooth transition between all gear ratios as the drive chain sprockets and chain slides are reciprocated within their respective radially aligned slots in response to the external forces applied upon the bicycle pedals.

The diametrically aligned orientation of the chain drive sprockets in conjunction with the ninety degree circular offset alignment of the chain slides relative to the reference wheel together with the continuous bias of the four coil springs allows conscious, automatic locking of the chain drive sprockets in any torque adjusted radial position. The diametrical engagement of the chain drive sprockets with spaced chain links prevents the unwanted expansion of the effective drive wheel diameter upon release of torque on the pedal arms, such as may occur when a cyclist is forced to stop for any reason on an incline while climbing a hill.

In those instances when expansion of the effective drive diameter of the chain drive sprockets is desired, the operator can consciously rotate the pedals to an expansion permitting orientation wherein only one of the chain drive sprockets will be engaged with the drive chain. In this position, the two chain drive sprockets will no longer be locked in position on the chain and the plurality of coil springs will be free to bias the drive sprockets and chain slides in unison to their respective expanded positions. The four coil springs operate in a balanced and uniform manner to equally distribute the spring biased forces about the drive assembly. In the preferred embodiment, a means is provided adjacent each coil spring to permit easy tension adjustment of the springs individually, whereby a cyclist can fine tune the transmission to accommodate his particular strength and operating characteristics. The hydraulic damping influences of the hydraulic cylinder will be applied continuously in the system whenever changes in torque on the pedal arms will cause a corresponding increase or decrease in the chain drive sprocket effective diameter.

It is therefore an object of the present invention to provide an improved automatic bicycle transmission of the type set forth.

It is another object of the present invention to provide a novel automatic bicycle transmission which comprises in combination an expanding and retracting sprocket wheel assembly means in driving engagement with a drive chain to automatically adjust the gear ratio, a spring biased pivotal takeup means to maintain drive chain taut in all expanded and retracted conditions of the sprocket wheel assembly means, and a hydraulic cylinder means to dampen the pivotal movements of the chain takeup means to provide hydraulic smoothness during all gear ratio changing procedures.

It is another object of the present invention to provide a novel automatic bicycle transmission comprising a reference wheel, a pair of diametrically opposed, radially movable and rotatable chain drive sprockets, a pair of diametrically opposed, radially movable and rotatable chain slides, a plurality of spring means to continuously bias the chain drive sprockets and chain slides radially outwardly, a rotatable star to assure simultaneous radially inward and outward movement of the chain drive sprockets and the chain slides in response to the application of torque upon the pedal arms, and dampening means to assure smooth hydraulically dampened, radial movements of the chain drive sprockets and chain slides between expanded and contracted positions.

It is another object of the present invention to provide a novel automatic bicycle transmission comprising a reference wheel, a pair of diametrically positioned chain drive sprockets which are radially reciprocal within radial slots in the wheel, a pair of diametrically positioned chain slides which are radially reciprocal in radial slots in the reference wheel, the pair of chain slides being positioned in ninety degree circular offset relationship to the pair of chain drive sprockets, means to lock the chain drive sprockets in any radially expanded or contracted position relative to the reference wheel, the means to lock comprising a plurality of equally spaced coil spring means to continuously bias the chain drive sprockets diametrically apart and dampening means to hydraulically smooth the radial travel of the chain drive sprockets and chain slides to facilitate radial movement without clatter, looseness or objectionable noise.

It is another object of the present invention to provide a novel automatic bicycle transmission that is simple in design, rugged in construction and troublefree when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a side elevational view of a bicycle equipped with an automatic transmission in accordance with the present invention.

FIG. 2 is an enlarged, exploded perspective view of the sprocket wheel assembly.

FIG. 3 is a partial, side elevational view showing the relative positions of the operating elements with the chain drive sprockets in their expanded, high gear ratio position and partly broken away to expose interior construction details.

FIG. 4 is a partial, side elevational view similar to FIG. 3 showing the relative positions of the operating elements with the chain drive sprockets in an intermediate gear ratio position and partly broken away to expose interior construction details.

FIG. 5 is a partial, side elevational view similar to FIG. 3, showing the relative positions of the operating elements with the chain drive sprockets in their retracted, low gear ratio position and with parts partly broken away to expose interior construction details.

FIG. 6 is a partial, side elevational view on reduced scale showing the opposite side of the sprocket wheel assembly with the parts corresponding to the position illustrated in FIG. 3.

FIG. 7 is a partial, elevational, enlarged view of the coil spring interconnection between the star and a crank arm, with the cover partially broken away to expose interior construction details.

FIG. 8 is an end elevation view of the sprocket wheel assembly looking from line 8—8 on FIG. 3 in the direction of the arrows.

FIG. 9 is a partial, side elevational view on reduced scale showing the opposite side of the sprocket wheel assembly with the parts corresponding to the position illustrated in FIG. 4.

FIG. 10 is a partial, side elevational view on reduced scale showing the opposite side of the sprocket wheel assembly with the parts corresponding to the opposite illustrated in FIG. 5.

FIG. 11 is an enlarged cross-sectional view taken along line 11—11 in FIG. 5, looking in the direction of the arrows.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIG. 1 a bicycle 10 of conventional design which comprises generally a frame 12 and a front wheel 14 and rear wheel 16 which are rotatable relative to the frame in well known manner. Pedals 18,19 and pedal arms 20,21 supply rotative power to the sprocket wheel assembly 22 of the present invention to rotate a conventional drive chain 24. The drive chain in turn rotates the rear driven gear 26 to thereby transmit pedal power to the rear wheel 16 for bicycle propelling purposes. As illustrated, a takeup mechanism 28 is affixed to the bicycle frame adjacent to the driven gear 26 and is provided to maintain the drive chain 24 taut under all expanded or retracted conditions of the sprocket wheel assembly 22.

As illustrated, a hydraulic cylinder 30 is affixed to the bicycle frame 12 in conventional manner, such as by employing one or more frame mounting brackets 112. A control cable 32 including a conventional control cable cover 138 is functionally operable between the hydraulic cylinder 30 and the takeup mechanism 28 in the manner hereinafter more fully set forth. One or more conventional control cable clamps 140 can be employed in the usual manner to maintain the control cable 32 tightly associated with portions of the bicycle frame 12 to thereby prevent inadvertant disassociation of the parts.

Referring now to FIGS. 2 and 4, a star 48 comprising a circular hub 49 and a plurality of radially oriented fingers 50, 52, 54, 56 is rotatable upon the main bushing 46 independently of the reference wheel 34 and is connected indirectly to the reference wheel 34 through a plurality of individual crank arms or links 58, 60, 62, 64. Each crank arm is pivotally interconnected at its radially inward end with the radially outwardly positioned end of one of the fingers 50, 52, 54, 56 of the star 48 in a pivotal connection. A coil spring 66 is interposed between each interconnection between a crank arm and a star finger in a manner to normally bias the crank arm outer ends radially outwardly away from the shaft 44. The inward end of 146 of each coil spring 66 is affixed within a stepped pin 142 which is secured to a finger of the star in a non-movable construction. Each crank is arranged for pivotal movement about a pin 142 and is provided with a plurality of adjustment openings 68, 70. The other or outer end 162 of the spring 66 is bent and engages a part of the spring cover 74 for spring adjustment as hereinafter more fully set forth.

The outer end of each crank arm 58, 60, 62, 64 terminates in a circular bearing connector 154 to rotatably receive therein the bearing portion 152 of a chain slider assembly or the bearing portion 155 a chain drive gear assembly.

As best seen in FIG. 2, and with reference to FIGS. 3, 4 and 5, it will be seen that the sprocket wheel assembly 22 comprises generally a reference wheel or main wheel 34, which wheel includes an outer, peripheral rim 35 and a plurality of radially oriented, ninety degree offset flat ribs or spokes 36. Each of the ribs or spokes 36 is provided with a radially oriented, elongated central opening or slot 38 for reciprocation therewithin of a chain slider 42, 43 or a chain drive sprocket or chain drive slider 40, 41. See FIGS. 6, 9 and 10. The pedal arms or cranks 20, 21 are connected radially inwardly in well-known manner to a shaft 44, in a usual one-piece or three-piece construction, to rotate the shaft and the attached reference wheel 34 directly by applying rotative forces upon the pedals 18, 19. A conventional pin 156 is affixed to a pedal arm 20 and engages within a cooperating opening 160 provided in the reference wheel 34 to rotate the sprocket wheel assembly when the pedals 18, 19 are rotated.

Referring now to FIGS. 2 and 3, a star 48 comprising a circular hub 49 and a plurality of fingers 50, 52, 54, 56 radiating therefrom is rotatable upon the bushing 46 independently of the reference wheel 34 and is connected indirectly to the reference wheel 34 through a plurality of individual crank arms or links 58, 60, 62, 64. Each crank arm is interconnected at its radially inward end with the radially outwardly positioned end of one of the fingers 50, 52, 54, 56 of the star 48 in a pivotal connection comprising a bearing or pin 152. The pin is provided with a threaded opening 142 and slot 158 as illustrated. A coil spring 66 is interposed at each interconnection between a crank arm and a star finger in a manner to normally bias its associated crank arm outer end radially outwardly away from the shaft 44. The inward end 146 of each coil spring 66 is affixed within the pin slot 158 which pin is secured to a finger of the star in a non-movable construction. The other end 148 of the coil spring 66 is affixed within an opening provided in the coil spring cover 74. Thus, when the cover 74 is rotated relative to the pin or bearing 152, the bias of the coil spring can accordingly be varied.

Each crank arm 58, 60, 62, 64 is arranged for pivotal movement about a pin 152 and is provided with a pivot opening 164 of suitable size to pivotally overfit a pin or bearing 152. A plurality of adjustment openings 68, 70 are provided in each crank arm. As best seen in FIG. 7, each coil spring cover 74 is provided with an adjustment pin 72 for releasable engagement within one of the crank arm adjustment openings 68, 70. As above set forth, one end 146 of each coil spring 66 is secured within the slot 158 of a star affixed pin 152 and has its other end 148 secured to the coil spring cover 74. By relocating the position of the coil spring cover pin 72 within different adjustment openings 68, 70, the spring bias at each pivoted interconnection between a star finger 50, 52, 54, 56 and its pivotally associated crank arm 58, 60, 62, 64 can thereby be easily adjusted. A screw 150 is positioned through an opening 160 provided in each cover 74 and is threadably engaged in the opening 142 provided in each pin or bearing 152 to maintain the desired association and orientation of each cover 74 relative to a crank arm 58, 60, 62, 64.

The outer end of each crank arm 58, 60, 62, 64 terminates in a circular connector 154 to rotatably receive therein the bearing portion of a key 82 of a chain slider, 42, 42 or the bearing portion of a similar key 82 of chain gear slides or sprocket 40, 41. As best seen in FIGS. 2 and 8, the keys 82 project at right angles from the plane of each chain gear slider 40, 41, and each chain slider 42, 43 and respectively insert through a radial slot 38 which is formed in the reference wheel ribs or spokes 36. In this manner, it will be noted that the chain gear slides 40, 41 and the chain sliders 42, 43 will be arranged for radial reciprocation along the slots 38. Each key 82 includes a radially outwardly projecting lug 168 of sufficient size and strength to engage the connector ring 154 of each crank arm 58, 60, 62, 64 to maintain the association of each crank arm with a slider in a pivotal arrangement.

Referring now to FIGS. 1, 3, 4 and 5, a chain take-up mechanism 28 is affixed to the frame 12 adjacent to the rear driven gear 26 to maintain the chain 24 taut under all conditions as the chain gear sliders 40, 41 and chain sliders 42, 43 are reciprocated within the radial slots 38. A stationary mounting arm 92 carries a control cable wheel 94 in rotation arrangement about the pivot shaft 100. One end 170 of the control cable 32 is secured to the cable terminal 96 to rotate the wheel 94 in the manner hereinafter more fully set forth. As shown, the control cable cover or sheath 138 terminates in a conventional cable connector 98, which connector is secured to the mounting arm 92. The control cable extends from the connector 98, about the wheel 94 and terminates in a secure connection at the terminal 96. Thus, when the control cable is pulled upwardly as viewed in FIG. 4, the cable wheel 94 will be caused to rotate in a clockwise direction about the pivot shaft 100.

A take-up arm 102 is pinned or otherwise secured to the cable wheel 94 and accordingly is caused to rotate relative to the mounting arm 92 when the cable 32 causes rotation of the wheel 94. Note the various rotative positions of the take-up arm 102 as the cable wheel is rotated to various positions in FIGS. 3, 4, 5 and 6, thereby maintaining tightness of the drive chain 24. As illustrated, the take-up arm rotatively secures the take-up wheel 104 in rotative arrangement about the take-up wheel pin 106.

Still referring to FIGS. 1, 3, 4 and 5, a hydraulic cylinder 30 is affixed to portions of the bicycle frame 12 by employing conventional brackets 112. The control cable 30 is secured to portions of the frame 140 and has the other end of the cable cover secured in the cylinder cable connector 114 in usual manner. The cylinder 30 comprises generally a body or casing 108 having a tight fitting cover 110 secured thereto to prevent leakage of hydraulic fluid 174. A stationary block 130 is secured within the body 108 and this block is provided with one or more hydraulic fluid passages (not shown) to permit the free flow of the hydraulic fluid 174 through the block in response to operation of the piston 120. The block 130 terminates upwardly in a circular shoulder 176 to receive and seat thereon in a leakproof connection the base of a flexible hydraulic reservoir 136.

A piston 120 is reciprocal within the body 108 between a lowermost position as illustrated in FIG. 3 to an uppermost position as shown in FIG. 5. The piston 120 is provided with one or more peripheral fluid passages 128 to permit a portion of the hydraulic fluid 174 to flow around the piston as the piston is reciprocated in both directions. Additionally, an internal fluid passage 122 is provided through the piston 120 to increase the hydraulic fluid flow when the piston travels in the upward direction from its lowermost position toward its uppermost position. The fluid passage 122 terminates downwardly in a seat 124 upon which a ball 126 can rest in a fluid-tight closure.

When the piston travels downwardly within the body 108, the hydraulic fluid will push the ball 126 against its seat 124, thereby restricting fluid flow only through the peripheral fluid path 128 and thus offering increased hydraulic resistance to the travel of the piston. When the piston 120 travels upwardly within the body 108, the hydraulic fluid freely enters the top of the internal fluid passage 122. When moving in the upward direction, the hydraulic forces will push the ball 126 off of the seat 124, thereby increasing the available fluid path and thus offering less resistance to the fluid flow through and around the piston.

A coil spring 118 is positioned within the body 108 and biases between the top of the cylinder base and the bottom of the piston 120 to continuously urge the piston upwardly within the cylinder toward its uppermost position as illustrated in FIG. 5. A piston rod 132 is reciprocated by the piston 120 and is freely movable through a bore provided in the cylinder block 130. The piston rod upwardly carries a cable operator 134 to which is secured the upper end 172 of the control cable 32. A cylinder cable terminal 116 of known design securely fastens the end 172 of the cable 32 to the cable operator 134. Preferably, a flexible hydraulic reservoir is provided between the cable operator 134 and the shoulder 176 of the cylinder block 130 to retain therewithin all of the hydraulic fluid 174 that passes upwardly through the block 130 during the reciprocation of the piston 120.

It will be noted that the cylinder spring 118 continuously functions to try to pull the control cable 32 toward the position illustrated in FIG. 5, wherein the sprocket wheel assembly will be in its most collapsed or lowest gear ratio position. Simultaneously and oppositely, the four coil springs 66 of the sprocket wheel assembly 22 will continuously bias the sliders 40, 41, 42, 43 to the highest gear ratio position illustrated in FIG. 3. The bias of the four springs 66 is designed greater than the bias of the cylinder spring 118 and so, without the application of external forces, the automatic transmission will naturally assume the highest gear ratio position of FIG. 3.

The hydraulic fluid 174 within the cylinder 30 will provide a fluid damping action as the chain contacting sliders 40, 41, 42, 43 are reciprocated within the respective slots 38 in response to the forces applied upon the pedals 18, 19. It will be appreciated that considerably increased hydraulic fluid resistance will be offered as the chain sliders move from their innermost positions illustrated in FIG. 5 toward their outermost position of FIG. 3 inasmuch as the piston 120 will be moving downwardly within the cylinder body 108, thereby forcing the ball valve 126 against its seat 124 to close the interior fluid passageway 122. In this direction, the fluid can pass only about the piston through the peripheral fluid paths 128 and thereby provide increased hydraulic fluid resistance.

When the chain sliders 40, 41, 42, 43 are being urged in the opposite direction, that is, from the expanded position of FIG. 3 toward the retracted position of FIG. 5, the piston 120 will be moved in a direction toward the block 130, thereby causing the ball 126 to leave the seat 124 to thus expose an additional fluid path through the piston. The increased fluid flow will offer a corresponding decrease in fluid resistance and thereby permit a faster movement of the chain sliders in the radial inward direction.

Although the invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended.

What is claimed is:

1. An automatic transmission for use with a bicycle of the type including a frame, a front wheel, a rear wheel, a driven gear connected to the rear wheel and pedal cranks supplying input power comprising
    a sprocket wheel assembly rotatably mounted relative to the frame and being adapted for rotation by the pedal cranks,
        the sprocket wheel assembly comprising a reference wheel and a plurality of chain contacting elements radially movable relative to the reference wheel between radial inward positions and radial outward positions,
    the sprocket wheel assembly further comprising a star rotatably mounted relative to the frame adjacent to the reference wheel, the star having a plurality of radially extending fingers and a plurality of cranks, each crank being pivotally interconnected at one end with a finger and at its other end with a chain contacting element, the star being indirectly rotated by the pedal cranks;
    and a spring operatively mounted at the pivotal interconnection between each of the star fingers and the cranks, the springs continuously urging the chain contacting elements toward their said radial outward positions;
    a drive chain movable relative to the frame to rotate the driven gear, the drive chain being rotatably driven by at lease some of the chain contacting elements;
    chain take-up means secured to the frame to maintain the chain taut in response to all radial movements of the chain contacting elements,
        the chain take-up means comprising a pivotal assembly having pivotal movement relative to the frame; and
    damping means secured in stationary relationship to the frame to provide hydraulic damping forces to the pivotal assembly as the pivotal assembly is pivotally moved relative to the frame,
        the damping means comprising a hydraulic cylinder, the hydraulic cylinder comprising a body, hydraulic fluid within the body, a piston reciprocal within the body and a cable connector movable within the body in response to reciprocal movements of the piston;
        the damping means further comprising a flexible control cable, the control cable having one end connector to the hydraulic cylinder cable connector and its other end connected to a portion of the pivotal assembly;
        the piston being provided with a first hydraulic fluid passage and a one-way valve to close the fluid passage when the piston is reciprocated in a first direction, the end of the control cable being moved toward the pivotal assembly when the piston is moved in the said first direction, and
    a spring continuously biasing the piston in a direction to move the end of the control cable away from the pivotal assembly;
    whereby the hydraulic damping forces are transmitted through the chain to apply hydraulic damping forces upon the chain contacting elements as the chain contacting elements radially move.

2. The automatic transmission of claim 1 wherein the springs are coil springs.

3. The automatic transmission of claim 2 and means to adjust the bias of the springs to vary the spring forces urging the chain contacting elements outwardly, the means to adjust comprising means to individually vary the spring forces at each said pivotal connection whereby the springs are each adjustable relative to each other spring, the means to vary comprising a plurality of the adjustment openings in each crank arm.

4. The automatic transmission of claim 2 wherein the chain contacting elements comprise two chain gear sliders in diametrically opposed relationship, the chain gear sliders comprising a plurality of chain driving teeth and a pair of diametrically opposed chain sliders in sliding contact with the chain, each chain gear slider being circularly offset from a chain slider by ninety degrees.

5. The automatic transmission of claim 4 wherein the combined bias of the coil springs is greater than the bias of the piston spring.

6. In an automatic bicycle transmission of the type having a sprocket wheel assembly comprising a rotatable reference wheel and a plurality of chain contacting elements reciprocal relative to the reference wheel between radial inward and outward positions to vary the gear ratio between the input at the reference wheel and the output at a rear driven gear, a frame, an endless chain rotated relative to the frame by the sprocket wheel assembly to turn the driven gear and a spring normally urging the chain contacting elements toward their radial outward positions, the improvement comprising
    a star indirectly rotated by the reference wheel, the star comprising a finger indirectly connected to each chain contacting element;
    a link respectively pivotally connected to each star finger and pivotally connected to one of the chain contacting elements; and
    a spring interposed at each pivotal connection between a star finger and a link
        each spring being connected to continuously bias its associated link in a direction tending to urge a chain contacting element toward its radial outward position.

7. The automatic bicycle transmission of claim 6 and hydraulic cylinder means to impose hydraulic damping forces on the sprocket wheel assembly to hydraulically dampen the radial outward movements of the chain contacting elements relative to the reference wheel, the hydraulic cylinder means comprising a body and hydraulic fluid within the body.

8. The automatic bicycle transmission of claim 7 and a chain takeup assembly secured to the frame adjacent to the driven gear and in contact with the chain, the chain takeup assembly being pivotal relative to the frame to maintain the chain taut in all radial position of the chain contacting elements.

9. The automatic bicycle transmission of claim 8 wherein the hydraulic cylinder means comprises a cable terminal that is reciprocally movable within the body and a control cable interconnected between the movable cable terminal and the chain takeup assembly whereby portions of the chain takeup assembly will be pivoted about the frame when the cable terminal is moved.

10. The automatic bicycle transmission of claim 9 and fluid path means within the cylinder body to control the rate of movement of the cable terminal, whereby the hydraulic fluid offers greater resistance to cable movement in one direction than in the other direction.

11. The automatic bicycle transmissioin of claim 10 and means to vary the bias of each spring to adjust the spring forces individually at each pivotal connection between a star finger and a link.

* * * * *